United States Patent
Linnartz et al.

(10) Patent No.: US 7,336,712 B1
(45) Date of Patent: Feb. 26, 2008

(54) VIDEO SIGNAL TRANSMISSION

(75) Inventors: Johan P. M. G. Linnartz, Eindhoven (NL); Johan C. Talstra, Eindhoven (NL); Antonius A. C. M. Kalker, Eindhoven (NL); Nicolas Bailleul, Douvres la Delivrande (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/385,278

(22) Filed: Aug. 30, 1999

(30) Foreign Application Priority Data

Sep. 2, 1998 (EP) ................................. 98202942

(51) Int. Cl.
*H04N 7/12* (2006.01)
*H04N 5/91* (2006.01)

(52) U.S. Cl. ................................ 375/240.26; 386/94

(58) Field of Classification Search ............... 348/473, 348/569, 584, 589, 598; 360/15; 370/522; 375/240.01, 240.12–240.16, 240.26; 380/54, 380/201, 203; 386/94, 112, 96; 705/51, 705/57; 713/176; *H04N 7/12*
See application file for complete search history.

(56) References Cited

U.S. PATENT DOCUMENTS 5,479,299 A * 12/1995 Matsumi et al. ............ 386/112
5,838,874 A * 11/1998 Ng et al. ..................... 386/96
5,959,796 A * 9/1999 Matsumi et al. ............... 380/15
5,960,081 A * 9/1999 Vynne et al. ................. 713/176
5,969,770 A * 10/1999 Horton ........................ 348/569
6,226,041 B1 * 5/2001 Florencio et al. ...... 375/240.15
6,373,530 B1 * 4/2002 Birks et al. ............ 375/240.26
6,404,781 B1 * 6/2002 Kawamae et al. .......... 370/522
6,490,355 B1 * 12/2002 Epstein ....................... 380/203
6,523,113 B1 * 2/2003 Wehrenberg ................ 713/176

FOREIGN PATENT DOCUMENTS

WO         WO 96/19077        * 6/1996

* cited by examiner

*Primary Examiner*—Gims Philippe

(57) ABSTRACT

An MPEG video stream generator, which contains several slightly different programs, each with approximately the same content. The MPEG stream is constructed in such a manner that a simple transcoder can effectively select one of the programs. This is achieved by storing the differences relative to the default program in selected user data fields. The transcoder is little more than an MPEG bitstream parser, which replaces the bits corresponding to selected set of macroblocks by the replacement data stored in the user data fields. A standard MPEG decoder without any knowledge of the embedded user data fields will simply extracted the default program. One application relates to broadcasting of a television program with or without a logo, or a commercial with or without a public warning. Another application relates to copy-protection schemes. In such a scheme, the default program contains a ticket indicating that the contents may be copied once. Upon recording, this ticket is removed and replaced by the content accommodated in the user data field.

17 Claims, 3 Drawing Sheets

VIDEO SIGNAL TRANSMISSION

FIELD OF THE INVENTION

The invention relates to a method and an arrangement for transmitting video signals. The method comprises the steps of receiving an image of an original video signal, modifying an image area of said image to create a modified video signal, and transmitting the modified video signal. The invention also relates to methods and arrangements for receiving, decoding and transcoding such video signals.

BACKGROUND OF THE INVENTION

A method as defined in the opening paragraph is generally known and applied, inter alia, by television networks that modify an image area of an original video signal to include a visible logo. The logo identifies the broadcasting station or content owner. A useful property of the logo is that it remains visible after recording and thus assists in identifying illegal copies of home-recorded broadcast video material.

OBJECT AND SUMMARY OF THE INVENTION

It is an object of the invention to provide a method of transmitting video signals, which renders further advantages and new applications possible.

To this end, the method in accordance with the invention includes the step of transmitting an auxiliary signal defining replacement video information for said image area of the modified video signal. Herewith it is achieved that receivers or transcoders can easily remove a logo or other mark which has been visibly attached to a video signal, replace said logo or mark by the replacement video information, and reproduce or retransmit the thus obtained video signal. Preferably, the replacement video information is the image area of the original signal. This allows the receivers or transcoders to undo the modification of the image and reconstruct the original video signal.

The invention allows television program providers to simultaneously transmit slightly different versions of a television program in an effective manner as one physical signal. Signal distributors located at head-ends of cable networks may select one of the versions for further distribution. For example, TV programs with a logo are distributed to first recipients, whereas the same content without the logo is distributed to other recipients. Another example is the distribution of commercials with and without a public warning. Some countries require that such a warning be shown on screen if the advertised product is potentially dangerous to public health.

It is to be noted that a method of transmitting an original video signal and an auxiliary signal defining replacement video information for an image area thereof is known per se. For example, it is known to transmit a video signal along with subtitles accommodated in an auxiliary teletext data signal. Teletext receivers can display the subtitles, thereby replacing the original video information in an image area. The invention differs from this known method in that the main or "default" signal (which is understood to mean the signal which is reproduced by conventional receivers) is the modified signal. This renders it possible to assign a certain meaning to the signal modification, for example, an authorization to copy the video program, which is processed by all receivers, irrespective of whether or not they have provisions to undo the signal modification.

The invention is particularly useful if the original video signal is available in encoded form, for example, as an MPEG bitstream, and the modified signal is to be retransmitted in encoded form. In such an embodiment, in which the video signal is encoded into a channel bitstream and the image area is represented by a sub-series of bits, the replacement video information is preferably similarly encoded and represented by a substantially same number of bits as the modified image area. Stuffing bits may be inserted in either the modified signal or the auxiliary signal to achieve this. A receiver or transcoder can then simply replace the sub-series representing the sub-image by the auxiliary signal bits without any danger of causing buffer overflow or underflow problems in a subsequent decoder. The auxiliary signal is preferably accommodated in user data fields of the bitstream so that conventional (MPEG) decoders ignore this signal.

If the video signal is predictively encoded, the sub-images are advantageously accommodated in pictures which are not referred to by other pictures. For example, if the signal is encoded in accordance with the MPEG video compression standard, the sub-image is preferably accommodated in B-pictures only. This embodiment simplifies both the encoding and the decoding process considerably because the same I-pictures and P-pictures are used as reference, irrespective of whether the original or the modified video signal is to be (de-)coded.

DESCRIPTION OF A PREFERRED EMBODIMENT

Figure 1:
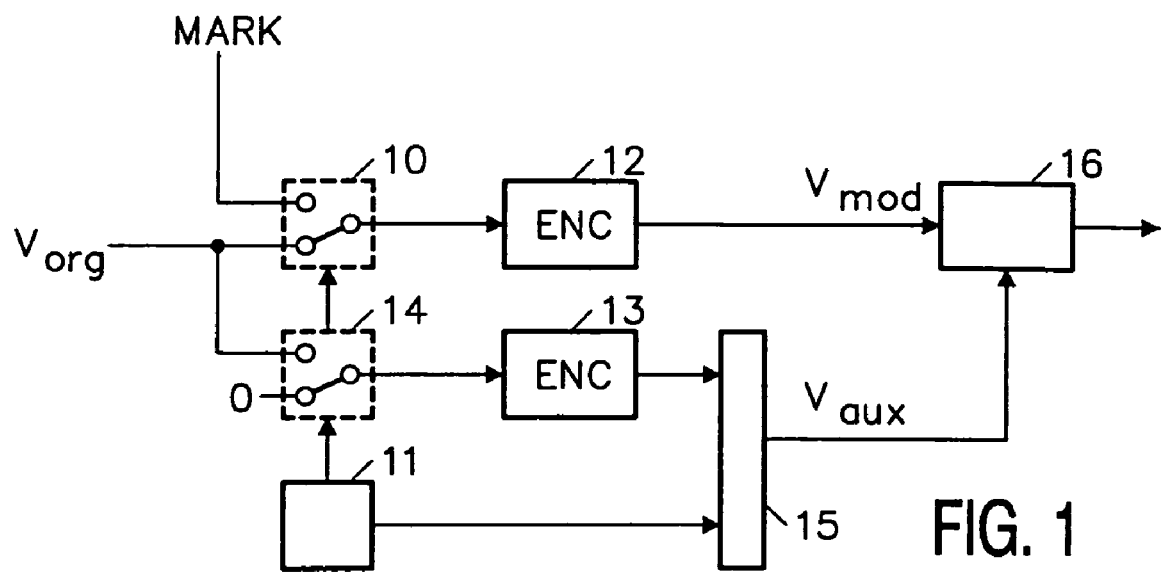
FIG. 1 shows a schematic diagram of an arrangement for transmitting video signals in accordance with the invention.

FIG. 1 shows a schematic diagram of an arrangement for transmitting video signals in accordance with the invention. The arrangement receives an original video signal $V_{org}$, which is applied to a first input terminal of an input selection switch 10, and a mark M, for example, a logo or a copy protection identifier, which is applied to a second input terminal of said switch. The selection switch 10 is controlled by a size and position control circuit 11 which determines the size and position of an image area in which the original video signal is to be replaced by the mark M. The selection switch 10 applies the selected video signal to a main MPEG encoder 12 to obtain an encoded modified signal $V_{mod}$.

The arrangement further comprises an auxiliary MPEG encoder 13 for encoding the original video signal image area, which is not included in the modified signal $V_{mod}$. In the Figure, this is achieved by a second selection switch 14, which is also controlled by the size and position control circuit 11 and applies the original video signal $V_{org}$ to the second encoder 13 when the first encoder 12 encodes the mark. The MPEG encoders 12 and 13 include a bit rate control circuit (not shown) so as to produce substantially the same number of bits for the mark and the original video signal image area.

The output of the second MPEG encoder 13 and data defining the size and position of the image area are multiplexed by a multiplexer 15 to form an encoded auxiliary video signal $V_{aux}$. The preferred embodiment of the arrangement further comprises a data embedding circuit 16 for accommodating the encoded auxiliary video signal $V_{aux}$ in user data fields of the "main" MPEG bitstream representing the modified signal $V_{mod}$. Thus, if the composite output bitstream of the arrangement is applied to a conventional MPEG decoder (which ignores user data fields), only the modified video signal will be decoded and the video image with the mark will be reproduced.

The embodiment of the arrangement for transmitting video signals, which is shown in FIG. 1, receives the original video signal in the pixel domain. This is not necessary. In Applicant's previously filed European patent applications 98400759.1 (PHF 98.544) and 98400802.9 (PHF 98.546) arrangements are proposed for inserting a logo in an already MPEG encoded video signal without requiring expensive full decoding of the bit stream. In accordance with this invention, the original bits of the macroblocks at the location of the logo are saved and added to the bit stream in the form of user data fields.

Figure 2:
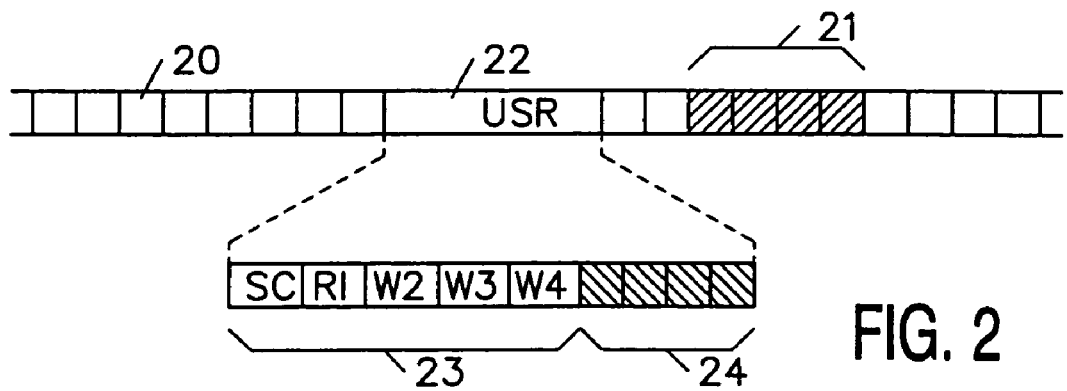
FIG. 2 shows the format of the output signal of the arrangement which is shown in FIG. 1.

FIG. 2 shows the format of the output signal of the arrangement for transmitting video signals. The output signal comprises a sequence of encoded macroblocks 20 representing the original video signal. A subsequence of macroblocks 21 represents the image area containing the mark. Numeral 22 denotes a user data field USR which is accommodated in the bitstream. This field USR comprises a header 23 and a sequence of encoded macroblocks 24 representing the original video image part. More particularly, the header 23 includes:

A start code SC to identify the start of a user data field. The MPEG standard provides the hexadecimal code 0000 01B2 for this purpose.

A replacement identifier RI to identify that the user data field includes video replacement data.

A number W2, which indicates the size of the user data field.

A number W3 defining the address of the first macroblock of the image area.

A number W4 indicating the length in bytes of the sequence of macroblocks, including stuffing bytes for alignment purposes.

Figure 3:
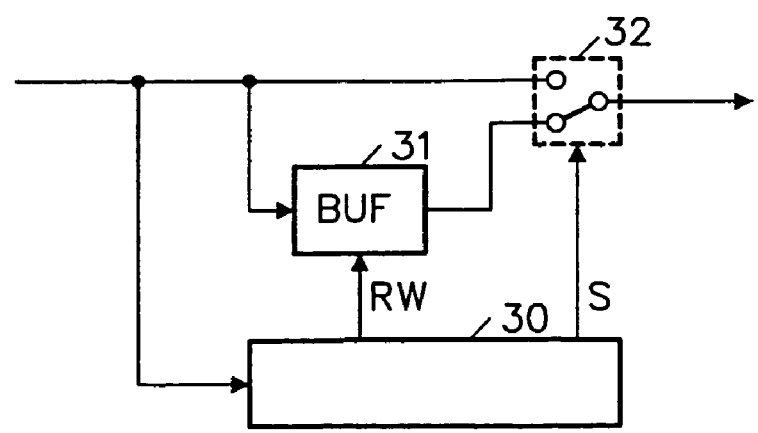
FIG. 3 shows a schematic diagram of an arrangement for removing the mark and decoding or retransmitting the original video signal in accordance with the invention.

FIG. 3 shows a schematic diagram of an arrangement for removing the mark from the modified signal in accordance with the invention. The arrangement receives the encoded composite video signal described above. The signal is applied to a control circuit 30, a buffer 31, and a first input terminal of a selection switch 32. The buffer output is connected to the second input terminal of the selection switch. The control circuit 30 controls writing and reading of the buffer 31 through control lines RW. The circuit also controls the state of the selection switch 32 through a select line S.

Figure 4:
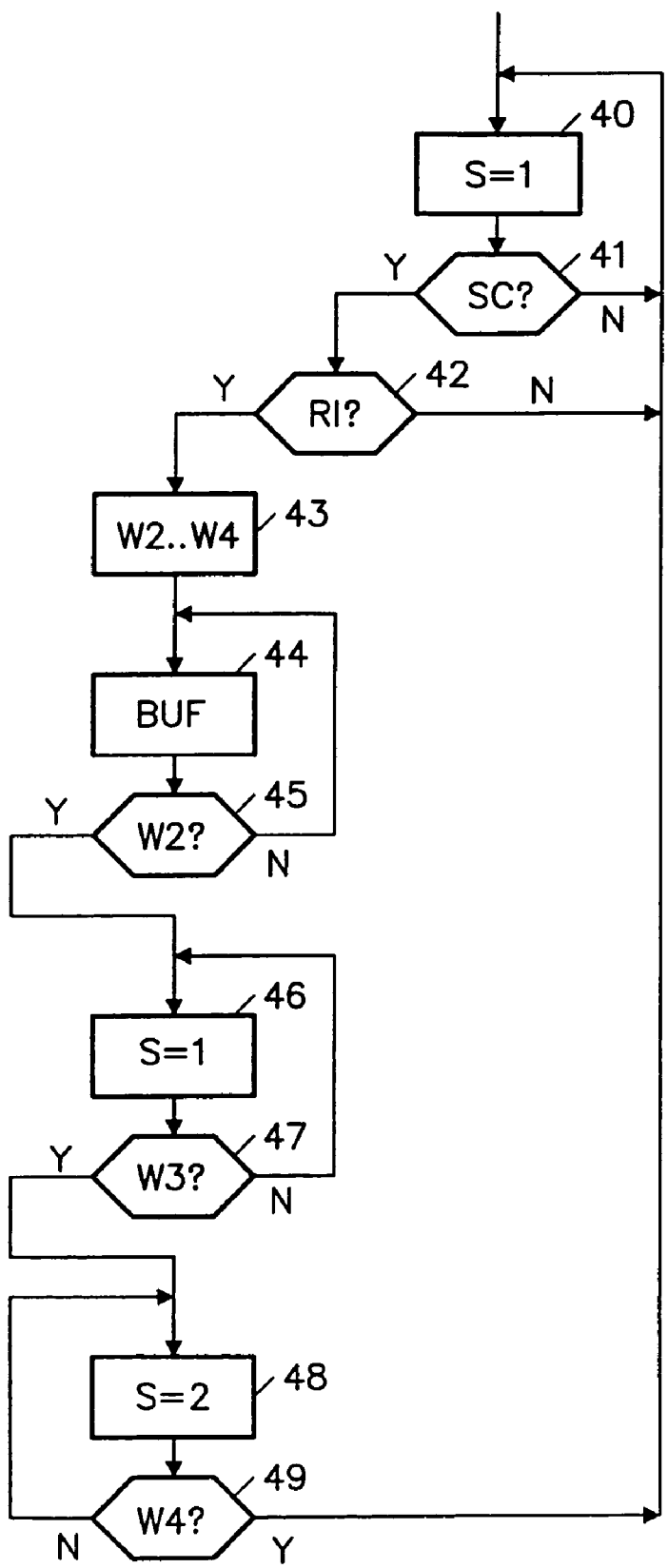
FIG. 4 shows a flow chart of operations that are performed by a control circuit which is shown in FIG. 3.

The operation of the arrangement is defined by a sequence of operational steps that are performed by the control circuit 30. FIG. 4 shows a flowchart of these operations. In a step 40, the control circuit controls the selection switch 32 to select the first (S=1) input terminal. In this state of the switch, the macroblocks 20 (see FIG. 2) representing the original video signal outside the modified image area are directly applied to the output of the arrangement. In a step 41, the control circuit checks the bitstream for the occurrence of the start code SC which identifies the start of a user data field. If the start code has been detected, the control circuit reads the replacement identifier RI in a step 42 and checks whether RI identifies that the user data field contains video replacement data. If that is not the case, the circuit returns to the step 40 and awaits a next occurrence of the start code.

If RI identifies that the user data field contains video replacement data, the control circuit reads the numbers W2, W3 and W4 in a step 43. Then, in a step 44, the control circuit stores the macroblocks representing the original video contents of the image area (24 in FIG. 2) in the buffer 30. The number of bytes to be stored in the buffer is determined by W4. Note that the buffer is fairly small because the image area covers a few macroblocks only. During this operation of writing video data in the buffer, the control circuit may optionally fill the user data field in the output bitstream with arbitrary data. The user data field is not removed so as to guarantee that a subsequent decoder input buffer does not overflow or underflow.

In a step 45, the control circuit detects the end of the user data field on the basis of the field size W2. The control circuit then continues in a step 46 in which it pass the received macroblocks to the output through the first (S=1) input terminal of the switch, until the first macroblock of the modified image area (21 in FIG. 2) is received. To this end, the current macroblock address is compared with the start address of the image area as defined by the number W3 in a step 47.

In a step 48, the control circuit controls the selection switch 32 to select the second (S=2) input terminal so that the buffer contents is applied to the output. As a result thereof, the macroblocks representing the modified image area are replaced by the macroblocks representing the original video image. The number of bytes to be replaced is defined by W4. If all bytes have been read from the buffer (step 49), the control circuit returns to the initial step 40 to pass the rest of the input stream (S=1) until a user data field with replacement video is found again.

The arrangement shown in FIG. 3 removes the mark from the modified video signal by simply replacing the macroblocks representing the modified image area by the replacement video macroblocks accommodated in user data fields. It will be appreciated that this simple replace operation is performed successfully if the MPEG decoder does not use the relevant macroblocks as reference for decoding other pictures. For this reason, the mark is preferably inserted in B-pictures only. Alternatively, the relevant macroblocks are autonomously (intra) encoded, irrespective of the picture type.

Figure 5:
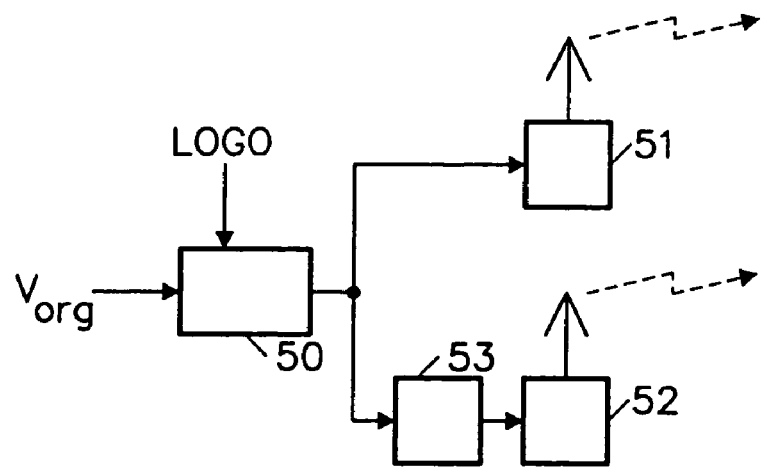
FIGS. 5 and 6 show schematic diagrams of applications of the invention.

FIG. 5 shows a schematic diagram of an application of the invention. In this application, a video program with a logo is broadcast in a first reception area and the same program without the logo is broadcast in a second environment. At the signal originating end, the system comprises an arrangement 50 which receives the original video signal and the logo. The arrangement 50 inserts the logo in the video signal in a manner as described before with reference to FIG. 1. That is, the output signal is an MPEG encoded version of the modified signal but also includes the original contents of the replaced image area as an auxiliary signal. The output signal is distributed to a first broadcast station 51 which broadcasts the signal without further processing. MPEG receivers receiving the signal from this station reproduce the video image with the logo. The signal from arrangement 50 is also distributed to a second broadcast station 51. This station comprises an arrangement 53 for removing the logo as described above with reference to FIG. 3. The second station thus broadcasts the same program without the logo.

Another application of the invention relates to copy protection. In Applicant's previously filed European patent applications 97200165.5 (PHN 16.210) and 97201470.8 (PHN 16.372), a copy protection scheme has been proposed which allows video contents to be copied once. Such a copy once scheme allows television programs to be recorded for later reproduction (time shift), but prohibits the making of higher generation copies. In this scheme, two signals are used:

An embedded watermark W to identify that the content is copy protected. The watermark can not be removed and indicates that the content may not be copied unless another mark T is present.

The mark T (hereinafter referred to as ticket) which is added to the content and which is to be removed upon making a (first) copy.

Figure 6:
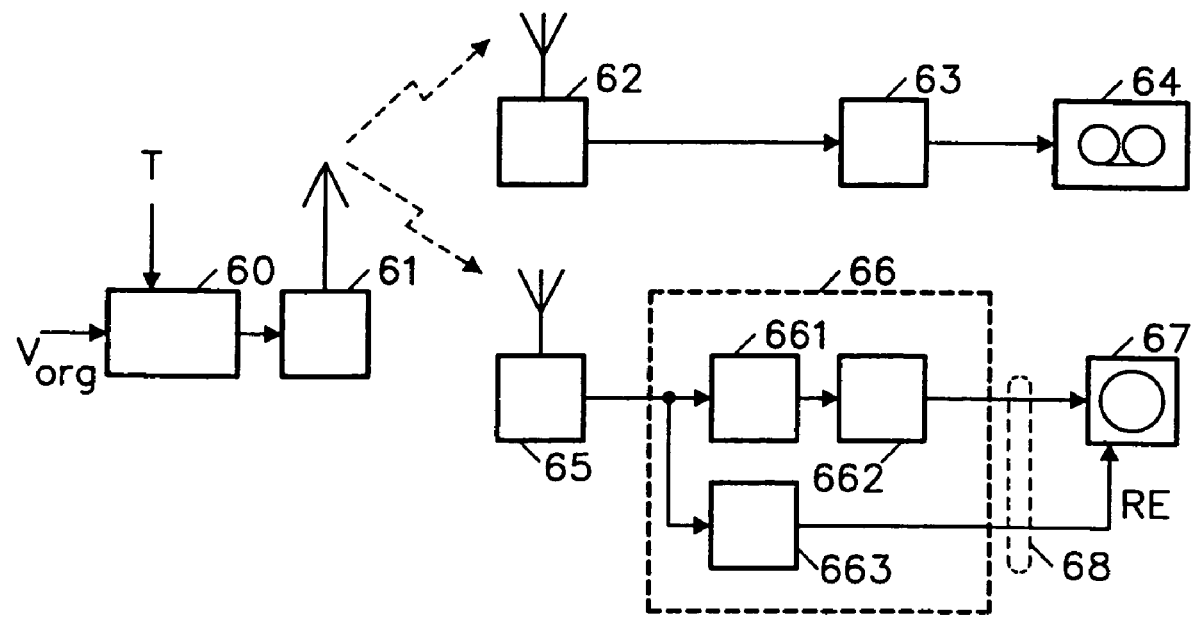

FIG. 6 shows a schematic diagram of a system to illustrate an advantageous copy protection scheme. In an arrangement 60, corresponding to the arrangement which is shown in FIG. 1, the ticket T is added to an original video signal $V_{org}$ in the form of a particular modification of a given image area. The ticket is, for example, a particular pattern of high chrominance frequencies in a few of the lower or upper lines of the television image. Such a ticket survives analog as well as digital transmission, is visible but does not substantially disturb the image, and does not survive recording by conventional video recorders. A transmitter 61 broadcasts the modified signal as well as the auxiliary signal defining replacement video for the modified image area, in a format as described above with reference to FIG. 2.

The signal from transmitter 61 is received by a conventional receiving system comprising a tuner 62, a conventional set top box (MBEG decoder) 63, and a conventional analog video recorder 64. The MPEG decoder decodes the modified signal including the ticket and applies it to the video recorder in a conventional analog (RGB or YUV) signal format. Because the ticket contains high chrominance frequencies that are not recorded, the ticket is removed from the copy.

The signal from transmitter 61 is also received by a novel receiving system comprising a tuner 65, a set top box 66, and a digital versatile disc (DVD) recorder 67. The novel set top box 66 comprises an arrangement 661 corresponding to the arrangement which is shown in FIG. 3. This arrangement removes the ticket T from the received signal and replaces it by the contents (preferably, the original video image area) accommodated in the user data field. As already described above with reference to FIG. 3, the size of the MPEG stream is not changed thereby, so that virtual buffer regulations are complied with. As the ticket information is no longer needed, and its presence even creates a security risk, the user data field is preferably filled with arbitrary data.

The signal process by the arrangement 661 is then recorded on the DVD recorder 67, either directly (if the recorder except the MPEG signal format) or via conventional MPEG decoder 662. The DVD recorder is of a type which records and applied signal only if it is accompanied by a record enable control signal RE. The signal is generated by a ticket detection circuit 663 and applied to the recorder through a secure communication link 68, for example an IEEE 1394 bus.

The system shown in FIG. 6 prohibits making next generation copies of recorded material. An MPEG encoder program recorded on DVD can be re-applied to the set top box 66 and reproduced through the MPEG decoder 662. However, the program cannot be recorded anymore because the ticket T has been removed. Similar considerations applied to the making of high-quality (digital) copies of recordings made by the conventional video recorder 64. Because the ticket is absent from the first generation copy, digital copying on new equipment such as DVD recorder 67 is not possible.

In summary, the generation of an MPEG video stream is disclosed, which contains several slightly different programs, each with approximately the same content. The MPEG stream is constructed in such a manner that a simple transcoder can effectively select one of the programs. This is achieved by storing the differences relative to the default program in selected user data fields. The transcoder is little more than an MPEG bit stream parser, which replaces the bits corresponding to a selected set of macroblocks by the replacement data stored in the user data fields. A standard MPEG decoder without any knowledge of the embedded user data fields will simply extract the default program.

The invention claimed is:

1. A method of transmitting video signals, comprising the steps of:

receiving an original video signal defining, on display, an image;

modifying a portion of said original video signal in order to form, on display, a modified image area of said image, thereby creating a modified video signal, this modification being visible to a viewer of the image;

transmitting the modified video signal;

transmitting an auxiliary signal as a sub-series of bits defining replacement video information for said modified portion of the original video signal corresponding, on display, to the modified image area of the image as a sub-series of bits, wherein said sub-series of bits is encoded by a substantially same number of bits as said modified portion of the original video signal corresponding, on display, to said modified image area.

2. The method as claimed in claim 1, wherein said replacement video information corresponds, on display, to the image area of the original video signal.

3. The method as claimed in claim 1, wherein the auxiliary signal further includes data defining the position and/or size, on display, of the image area corresponding to the replacement video information.

4. The method as claimed in claim 1, in which the modified video signal is encoded into a bitstream and the portion of the modified video signal corresponding, on display, to the modified image area, is represented by the sub-series of bits, characterized in that the replacement video information is encoded and represented by a substantially same number of bits as the portion of the modified video signal corresponding, on display, to the modified image area.

5. The method as claimed in claim 4, wherein the auxiliary signal is accommodated in user data fields of the bitstream.

6. The method as claimed in claim 4, wherein the modified video signal is predictively encoded and the step of modifying is applied to pictures which are not referred to by other pictures.

7. The method as claimed in claim 4, wherein the modification of the portion of the original video signal corresponding, on display, to the image area, identifies copy protection status information.

8. The method as claimed in claim 7, wherein the original video signal is modified in such a manner that the modified video signal forms, on display, an image having a pattern that is not reproduced upon playback by conventional analog video recorders.

9. An arrangement for transmitting a video signal, comprising:
- means for receiving an original video signal defining, on display, an image;
- means for modifying a portion of said original video signal in order to form, on display, a modified image area of said image, thereby creating a modified video signal, the modification being visible to a viewer of the image;
- means for transmitting the modified video signal; and
- means for transmitting an auxiliary signal as a sub-series of bits defining, on display, a sub-image to replace the modified image area formed, on display, by the modified video signal, and wherein said auxiliary signal forming, on display, said sub-image, is encoded by a substantially same number of bits as the portion of said modified video signal forming, on display, said image area.

10. A method of decoding a digital video signal, comprising the steps of:
- receiving a main bitstream representing, on display, an image of a video signal;
- receiving an auxiliary bitstream representing replacement video information corresponding to, on display, an image area of said image;
- replacing a sub-series of bits of said main bitstream representing said image area by said replacement video information to obtain a modified bitstream, wherein said modified bitstream defines said sub-series by a substantially same number of bits as a sub-series of bits representing said image area in said main bitstream; and
- decoding said modified bitstream.

11. A method of transcoding a digital video signal, comprising the steps of:
- receiving a main bitstream representing, on display, an image of a video signal;
- receiving an auxiliary bitstream representing replacement video information corresponding, on display, to an image area of said image;
- replacing a sub-series of bits of said main bitstream representing said image area by said replacement video information to obtain a modified bitstream, wherein said modified bitstream defines a sub-series of bits corresponding to said replacement video information by a substantially same number of bits as said sub-series of bits in said main bitstream; and
- transmitting said modified bitstream.

12. The method as claimed in claim 11, wherein the auxiliary bitstream is accommodated in user data fields of the main bitstream.

13. The method as claimed in claim 11, further comprising the step of:
- deriving the position and/or size of said image area from data included in the auxiliary bitstream.

14. The method as claimed in claim 11, further comprising the steps of:
- determining whether the image area represented by said sub-series of bits of said main bitstream identifies copy protection status information; and
- enabling recording of the modified bitstream if said determination is positive.

15. An arrangement for decoding a digital video signal, comprising:
- means for receiving a main bitstream representing an image of a video signal;
- means for receiving an auxiliary bitstream representing replacement video information for an image area of said image;
- means for replacing a sub-series of bits of said main bitstream representing said image area by said replacement video information to obtain a modified bitstream, wherein said sub-series is represented by a substantially same number of bits as a sub-series of bits of said auxiliary bitstream corresponding to said replacement video information representing said image area; and
- means for decoding said modified bitstream.

16. An arrangement for transcoding a digital video signal, comprising:
- means for receiving a main bitstream representing an image of a video signal;
- means for receiving an auxiliary bitstream representing replacement video information for an image area of said image;
- means for replacing a sub-series of bits of said main bitstream representing said image area by a sub-series of bits representing said replacement video information to obtain a modified bitstream, wherein said sub-series of bits of said main bitstream is represented by a substantially same number of bits as said sub-series of bits of said auxiliary bitstream representing said image area; and
- means for transmitting said modified bitstream.

17. The arrangement as claimed in claim 16, wherein said arrangement further comprises:
- means for determining whether the image area represented by said sub-series of bits of said main bitstream identifies copy protection status information; and
- means for enabling recording of the modified bitstream if said determination is positive.

* * * * *